(12) United States Patent
Choi et al.

(10) Patent No.: US 7,784,817 B2
(45) Date of Patent: Aug. 31, 2010

(54) EXTERNAL AIRBAG SYSTEM FOR VEHICLES

(75) Inventors: Hyeong Ho Choi, Gwangmyeong-si (KR); Yong Sun Kim, Namyangiu-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/479,095

(22) Filed: Jun. 5, 2009

(65) Prior Publication Data
US 2010/0140903 A1 Jun. 10, 2010

(30) Foreign Application Priority Data
Dec. 4, 2008 (KR) ...................... 10-2008-0122422

(51) Int. Cl.
*B60R 21/16* (2006.01)
(52) U.S. Cl. .............. 280/728.2; 280/743.1; 280/743.2; 180/274
(58) Field of Classification Search .............. 280/728.2, 280/728.3, 743.1, 743.2; 180/274
See application file for complete search history.

(56) References Cited

U.S. PATENT DOCUMENTS

| | | | | |
|---|---|---|---|---|
| 7,073,619 | B2 * | 7/2006 | Alexander et al. | 180/274 |
| 7,331,415 | B2 * | 2/2008 | Hawes et al. | 180/274 |
| 7,347,464 | B2 * | 3/2008 | Tanabe | 293/4 |
| 7,407,191 | B2 * | 8/2008 | Urushiyama | 280/784 |
| 7,416,043 | B2 * | 8/2008 | Pipkorn et al. | 180/274 |
| 7,575,086 | B2 * | 8/2009 | Kamei et al. | 180/274 |
| 2005/0269805 | A1 * | 12/2005 | Kalliske et al. | 280/730.1 |
| 2006/0064220 | A1 * | 3/2006 | Murakami et al. | 701/45 |
| 2006/0185923 | A1 * | 8/2006 | Tanabe | 180/274 |
| 2008/0011536 | A1 * | 1/2008 | Pipkorn et al. | 180/274 |
| 2009/0050395 | A1 * | 2/2009 | Hosokawa et al. | 180/274 |
| 2009/0102167 | A1 * | 4/2009 | Kitte et al. | 280/728.2 |

* cited by examiner

*Primary Examiner*—Toan C To
(74) *Attorney, Agent, or Firm*—Morgan, Lewis & Bockius LLP

(57) ABSTRACT

An external airbag system for a vehicle is proved to be commercialized and which can absorb impact induced by a frontal collision of the vehicle and thus substantially protect passengers in the vehicle. The external airbag system may include a bumper cover, a cushion provided behind the bumper cover, and an inflator for generating a gas pressure to deploy the cushion, wherein the bumper cover moves in a forward direction by the deploying cushion.

14 Claims, 6 Drawing Sheets

EXTERNAL AIRBAG SYSTEM FOR VEHICLES

CROSS-REFERENCE TO RELATED APPLICATION

The present application claims priority to Korean Patent Application Number 10-2008-0122422, filed on Dec. 4, 2008, the entire contents of which is incorporated herein for all purposes by this reference.

BACKGROUND OF THE INVENTION

1. Field of the Invention

The present invention relates to an external airbag which is provided in a front portion of a vehicle and is deployed just before the vehicle collides with an obstacle in front of the vehicle in order to absorb impact.

2. Description of Related Art

Hitherto, development of airbags for vehicles has focused on airbags (hereinafter, referred to as "internal airbags") which are installed in passenger compartments of vehicles to reduce a degree to which passengers are injured by collision with vehicle bodies or rigid parts in the passenger compartment. Driver-side airbags, passenger-side airbags, curtain airbags and seat-side airbags are representative examples of such internal airbags.

Recently, efforts have been made to reduce the impact to an entire vehicle which results from a collision with obstacles. An external airbag is one such effort. The external airbag is installed in a space between a bumper and a vehicle body. The external airbag is deployed forwards just before the vehicle collides with an obstacle, thus absorbing and mitigating impact.

However, to date, there has been taken only a conceptual approach to deploying an external airbag ahead of a bumper using gas pressure generated from an inflator. An external airbag system which can substantially exhibit the performance of protecting passengers has not yet been introduced.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an external airbag system for a vehicle which can be commercialized and which can absorb impact induced by a frontal collision of the vehicle and thus substantially protect passengers in the vehicle.

In an aspect of the present invention, the external airbag system for a vehicle, may include a bumper cover, at least a cushion provided behind the bumper cover, and at least an inflator for generating a gas pressure to deploy the cushion, wherein the bumper cover moves in a forward direction by the deploying cushion, wherein a portion of the bumper cover is fixed to a back beam.

The back beam may be fixed to a medial portion of the bumper cover and the cushions are disposed behind the bumper cover symmetrically with respect to the medial portion thereof with equal numbers.

One of the cushions may be provided to one side of the bumper cover and one of the cushions is provided to the other side of the bumper cover so that each side of the bumper cover is configured to be rotated forwards around the portion that the bumper cover and the back beam are fixed each other by a deployment force of the corresponding cushion, wherein a degree to which a portion of the cushion adjacent to corresponding distal end of the bumper cover is inflated is larger than a degree to which a portion of the cushion adjacent to the portion that the bumper cover and the back beam are fixed each other is inflated.

The external airbag system may further include at least a seam line formed on an inner surface of the bumper cover near the fixed portion of the bumper cover and the back beam.

The external airbag system may further include a holding member to limit a movement distance of each side of the bumper cover within a predetermined distance while the cushion is deployed.

The holding member may be a tether connected to each side of the bumper cover to the back beam.

The cushion and the inflator may be installed in a back beam provided behind the bumper cover and a recess is formed in the back beam to contain the cushion and the inflator therein, wherein a support bracket is provided on at least one of an upper surface and/or a lower surface of the back beam to support, along with the back beam, a rear portion of the cushion that is in a deployed state, and wherein the recess has a first recess for containing the cushion therein, and a second recess extending a predetermined depth rearwards from the first recess to contain the inflator therein, The external airbag system, may further include a retainer provided in the recess between the inflator and the back beam to fasten the inflator to the back beam, wherein the cushion is fastened to the retainer.

The external airbag system, may further include a retainer ring provided between the cushion and the back beam, the retainer ring having the inflator therein and fastened to the back beam.

The external airbag system, may further include a sensing unit for detecting an obstacle in front of the vehicle, and a control unit for determining whether the vehicle collides with the obstacle using a signal transmitted from the sensing unit and, when the collision is anticipated, operating the inflator before the vehicle collides with the obstacle.

In another aspect of the present invention, the external airbag system for a vehicle, may include a bumper cover, at least a cushion provided behind the bumper cover, at least an inflator for generating a gas pressure to deploy the cushion, and a back beam provided behind the bumper cover and having therein at least a recess for containing the cushion and the inflator, wherein at least one portion of the bumper cover is moved forwards away from an original position thereof by deployment force of the cushion, wherein a support bracket is provided on at least one of an upper surface and/or a lower surface of the back beam to support, along with the back beam, a rear portion of the cushion that is in a deployed state and a tether is connected between each of opposite sides of the bumper cover and the back beam.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
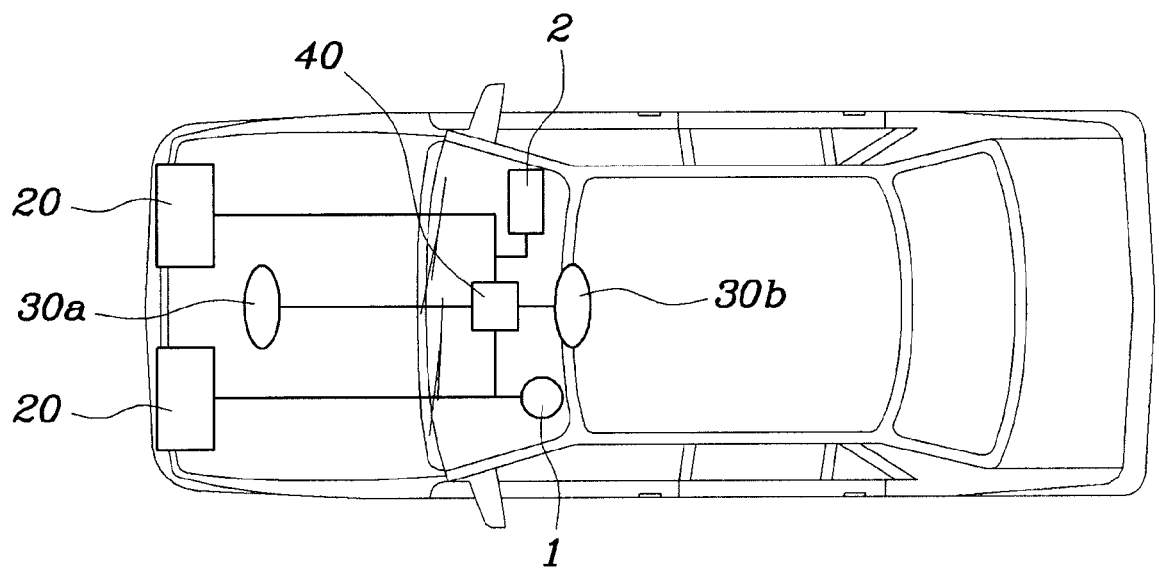
FIG. 1 is a schematic view illustrating an exemplary external airbag system for a vehicle, according to the present invention.

As shown in FIG. 1, an external airbag system according to various embodiments of the present invention includes cushions 20 which are installed in a front portion of the vehicle, a sensing unit which detects an obstacle in front of the vehicle, and a control unit 40 which determines whether the vehicle will collides with the obstacle using a signal transmitted from the sensing unit and, when the collision is anticipated, deploys the cushion 20 before the vehicle collides with the obstacle. A radar sensor 30a or/and a camera 30b can be used as the sensing unit. In FIG. 1, the reference numeral 1 and 2 respectively denote a driver's seat airbag and a passenger seat airbag.

Figure 2:
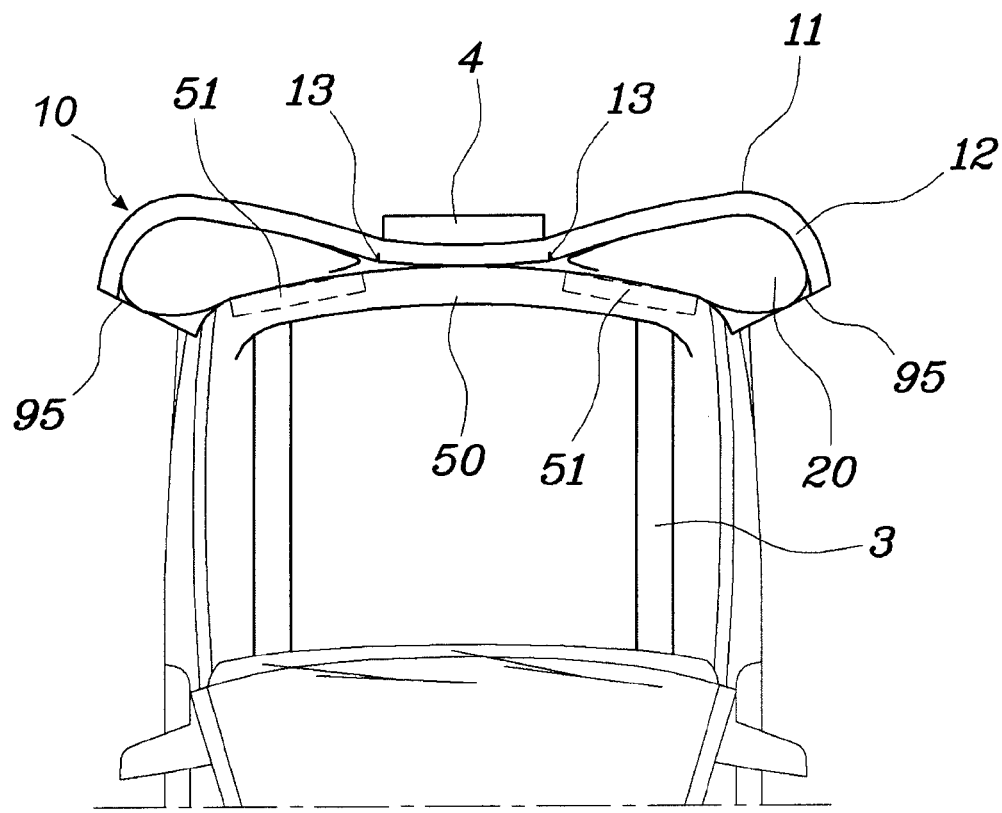
FIG. 2 is a view showing deployment of the external airbag system on the basis of FIG. 1.

Referring to FIG. 2, the cushions 20 are installed in respective recesses 51 which are formed in a back beam 50 behind opposite sides of the bumper cover 10. The bumper cover 10 can be moved forwards from its original position by deployment force of the cushions 20 and, in detail, the opposite sides of the bumper cover 10 can be respectively rotated forwards around the medial portion thereof.

To facilitate this rotational motion of the bumper cover 10, in various embodiments of the present invention, seam lines 13 which extend in the vertical directions may be formed in the inner surface of the bumper cover 10 at positions corresponding to a boundary with a license plate 4. When the cushions 20 are completely deployed, a degree to which outer portions of the cushions 20 corresponding to the opposite sides of the bumper cover 10 are inflated is larger than that of inner portions thereof corresponding to the medial portion of the bumper cover 10. A degree to which the opposite sides of the bumper cover 10 are moved away from the back beam 50 or are opened is determined by the tethers 95 running between the bumper cover 10 and the back beam 50. The number of the seam lines 13 may be increased so as to prevent a crack that may occur along the seam lines.

Meanwhile, the bumper cover 10 includes a bumper skin 11 and an absorber 12. Front side members 3 are connected to the rear surface of the back beam 50.

Figure 3:
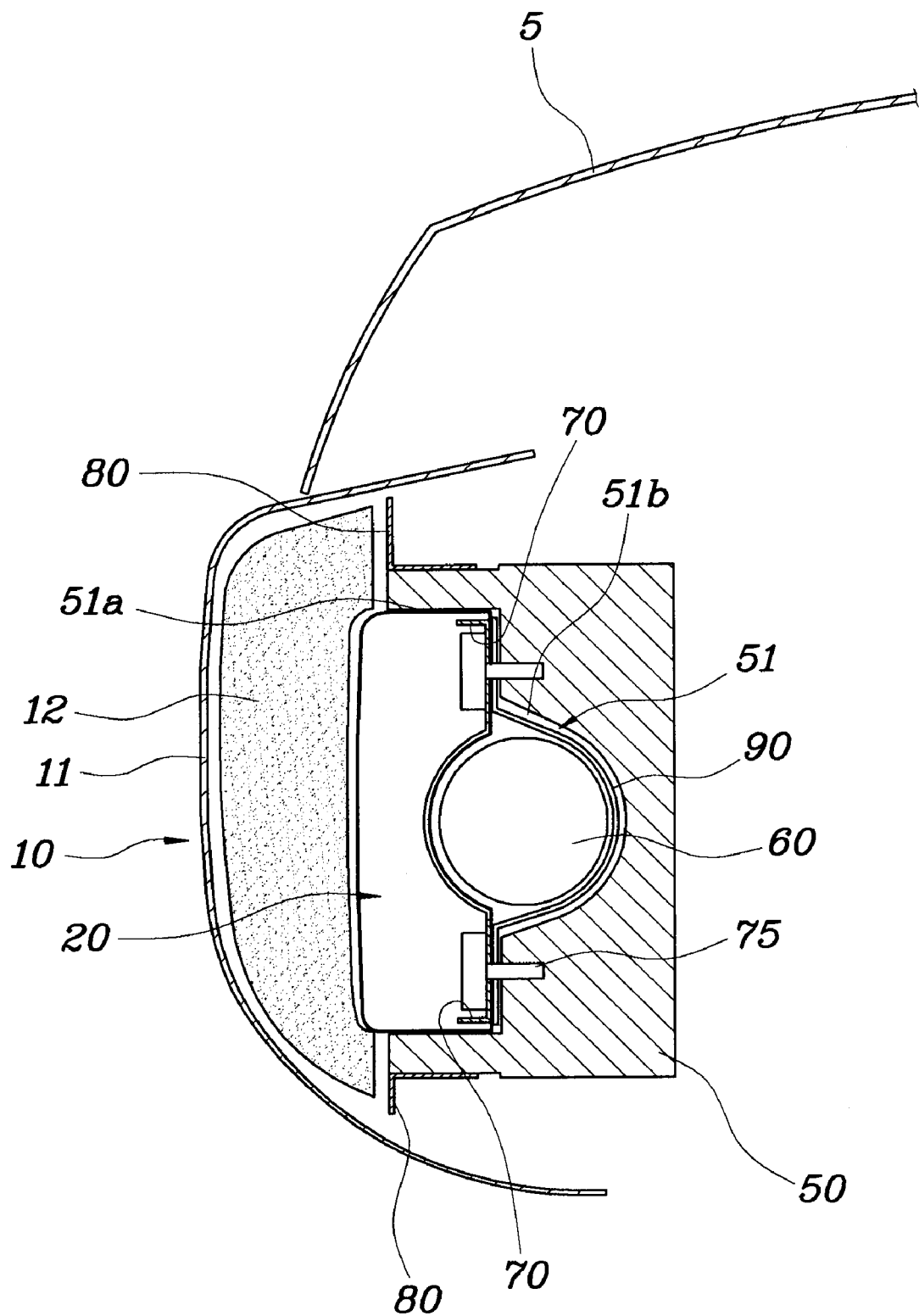
FIG. 3 is a schematic sectional view of the external airbag system of FIG. 1.

Referring to FIG. 3, an inflator 60 along with the cushion 20 is installed in each of the recesses 51 of the back beam 50. The inflator 60 generates gas pressure for deploying the cushion 20. For this, the recess 51 has a first recess 51a which contains the cushion 20 therein, and a second recess 51b which extends rearwards from the first recess 51a to a predetermined depth to contain the inflator 60 therein. The inflator 60 is disposed outside the cushion 20. A communication structure for transmission of gas pressure between the inflator 60 and the cushion 20 is provided therebetween. Support brackets 80 are provided on and under the back beam 50 to support the rear portion of the cushion 20 when it is deployed.

The structure for fastening the cushion 20 and the inflator 60 to the back beam 50 using a retainer 70 in the recess 51 will be explained with reference to FIGS. 3 and 4.

The retainer 70 includes a retainer frame 71 which has a mounting hole 71a on a central portion thereof, and a flange 72 which is provided along the outer edge of the retainer frame 71. The retainer 70 is disposed in a front surface of the cushion 20. The cushion 20 and the retainer 70 are fastened to the back beam 50 using fastening bolts 75 which are tightened from the interior of the cushion 20 into fastening holes 53 of the back beam 50 via through holes 73 of the retainer 70. The fastening bolts 75 are previously welded or fixed to the retainer 70. The cushion 20 is fastened to the retainer 70 by the fastening bolts 75. A nut on the rear surface of the back beam 50 is tightened over each fastening bolt 75. The fastening holes 53 are formed through a stepped portion 52 which forms a boundary between the first recess 51a and the second recess 51b. The flange 72 guides the direction in which the cushion 20 is deployed, and prevents the cushion 20 from being damaged by the sharp edge of the retainer frame 71.

Furthermore, the inflator 60 which is disposed between the cushion 20 and the back beam 50 is mounted to the rear surface of the retainer 70 using mounting brackets 90. To reliably mount the inflator 60 to the retainer 70, semicircular seating portions 71b are formed in the retainer 70. The inflator 60 is mounted to the retainer 70 in such a way as to insert it forwards into the semicircular seating portions 71b. The inflator 60 is fastened to the retainer 70 using the mounting bracket 90 which is fastened to the retainer 70 by mounting bolts 76 which are tightened into mounting holes 74 of the retainer frame 71 via through holes 91 of the mounting bracket 90. A connection hole 55 is formed in the second recess 51b, into which the inflator 60 is seated, so that an external electric wire 61 is connected to the inflator 60 through the connection hole 55.

Meanwhile, as is well-known to those skilled in the art, each cushion 20 is covered with a cover 21 such that it maintains a folded shape. A tear line 22 is horizontally formed in the cover 21 so that when the cushion 20 is inflated, it is extracted from the cover 21 through the tear line 22.

Figure 4:
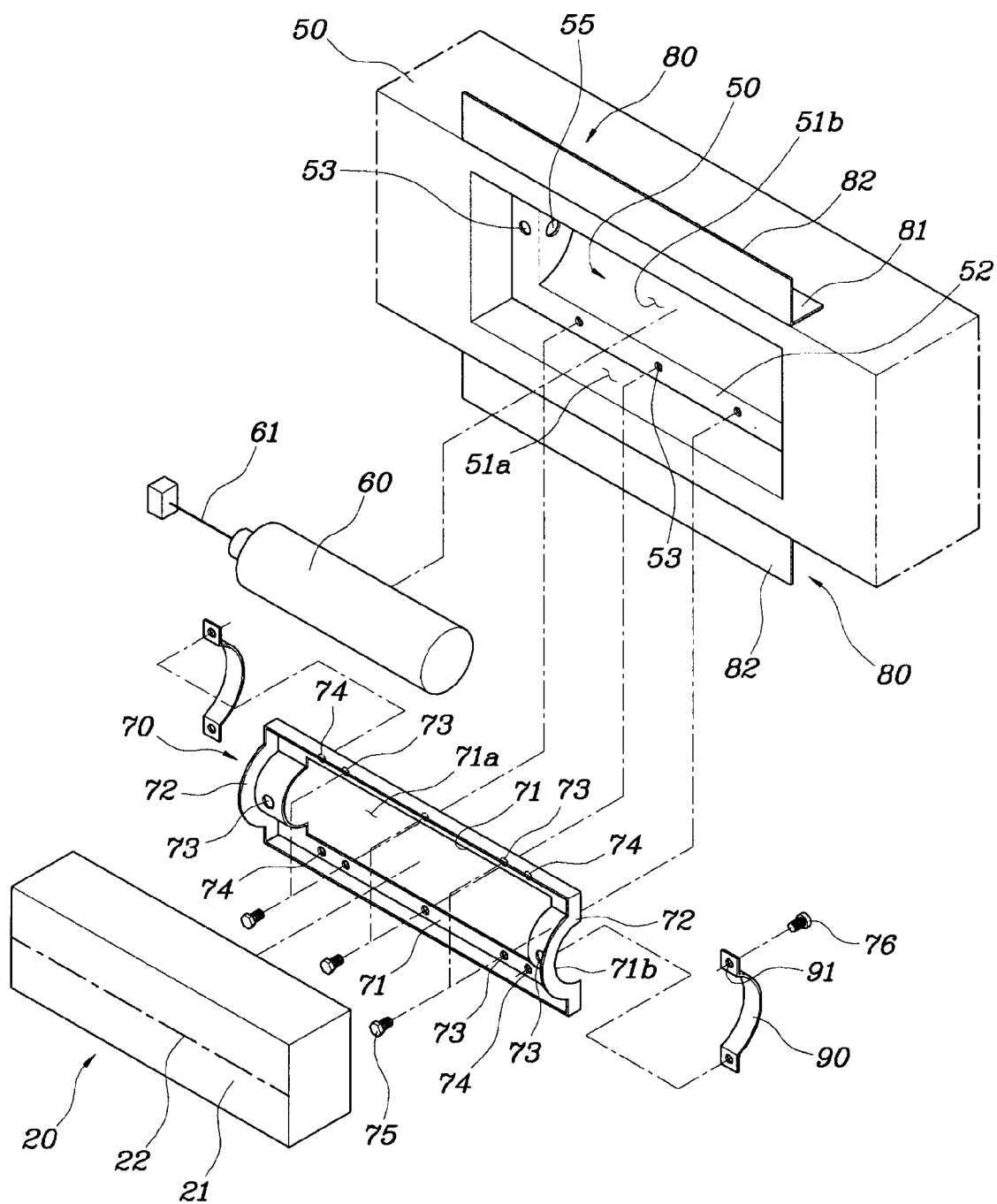
FIG. 4 is an exploded view of the external airbag system shown in FIG. 3.
Figure 5:
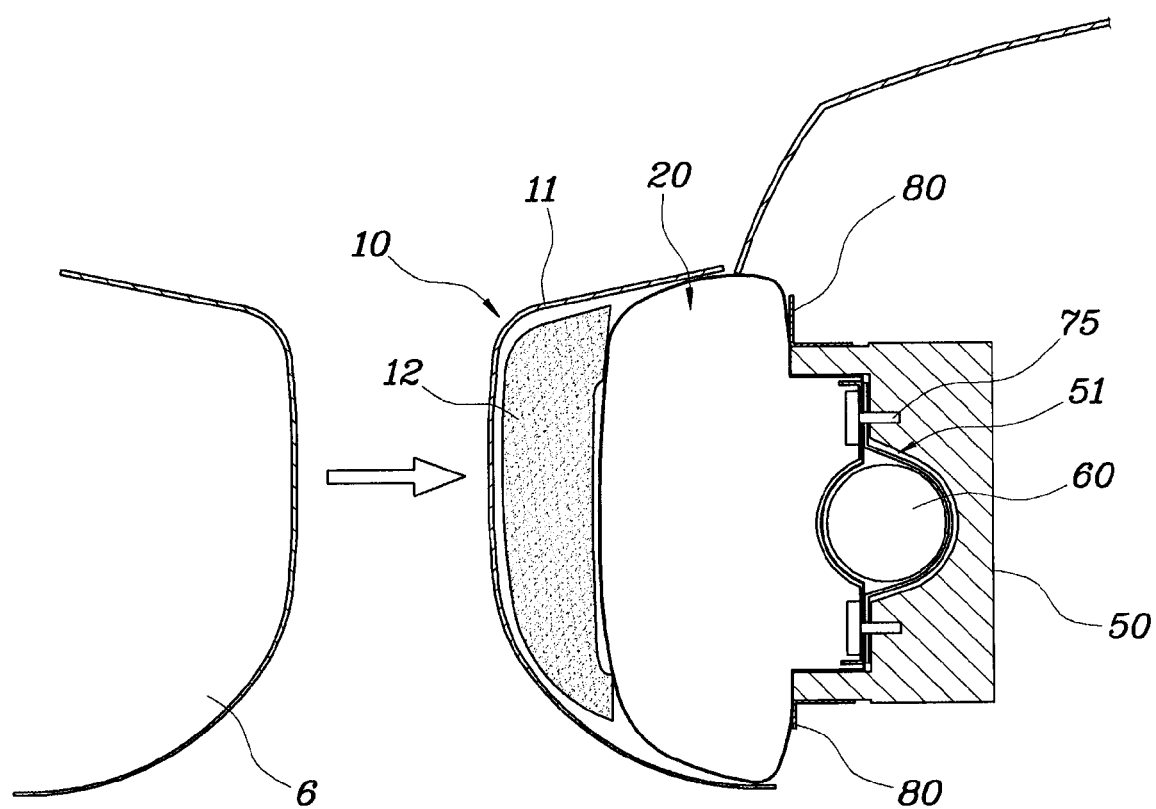
FIG. 5 is a view showing deployment of the external airbag system shown in FIG. 3.

In various embodiments of the present invention, as shown in FIGS. 4 and 5, the support brackets 80 are respectively provided on the upper surface of the back beam 50 and under the lower surface thereof at positions corresponding to the recess 51. Each support bracket 80 includes a mounting part 81 which is fastened to the back beam 50, and a support part 82 which perpendicularly extends from the mounting part 81. When the vehicle collides with a preceding vehicle 6, the cushions 20 withstand impact transmitted from the preceding vehicle 6 and are inflated upwards and downwards. At this time, the support brackets 80 support portions of the corresponding cushion 20 which are other than those portions supported by the back beam 50, in other words, the support brackets 80 increase the area and force of support for the cushion 20.

Figure 6:
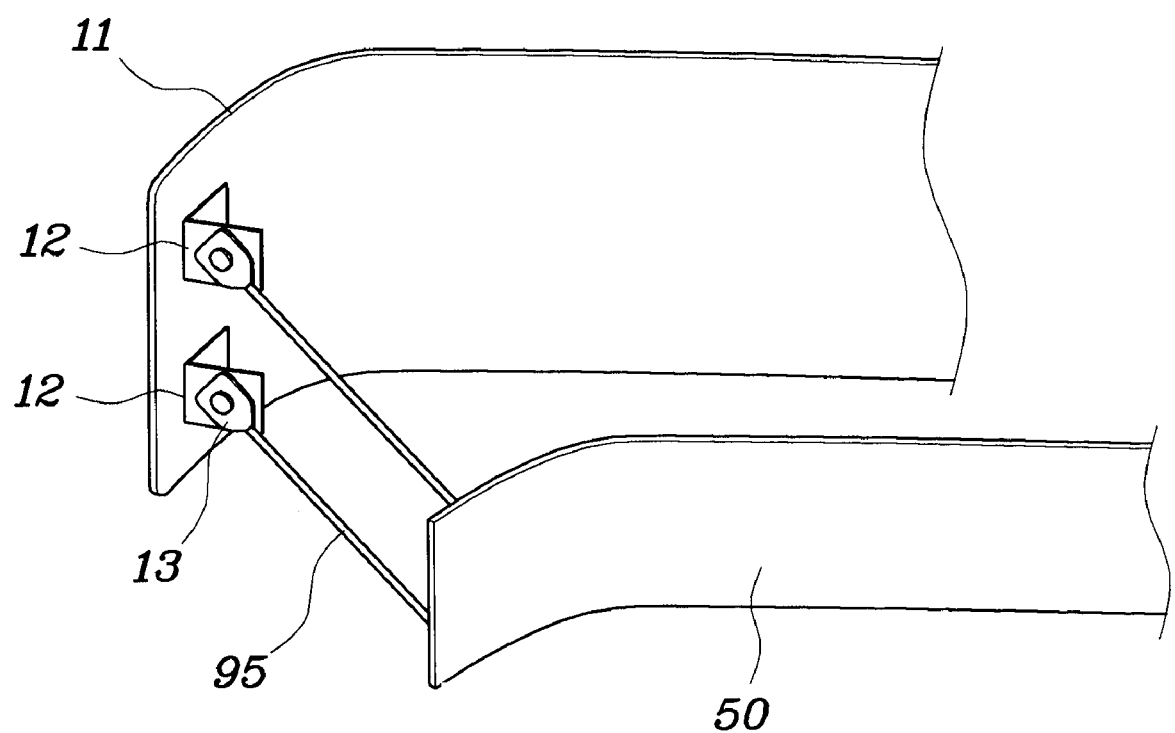
FIG. 6 is a view showing tethers of the external airbag system of FIG. 2 which are connected between a bumper cover and a back beam.

As shown in FIG. 6, a structure for mounting the tethers 95 is provided on the inner surface of each of the opposite sides of the bumper cover 10. In detail, brackets 12 are provided on the inner surface of the bumper skin 11. A holder 13 is provided on each bracket 12. One end of each tether 95 is fastened to the holder 13 of the corresponding bracket 12. The holder 13 is rotatable on the bracket 12 around a point at which the holder 13 is coupled to the bracket 12. In addition, a structure for mounting the tethers 95 is also provided on the back beam 50 to correspond to the above tether mounting structure. When the cushions 20 are completely deployed, the opposite sides of the bumper cover 10 may rattle in the state of being bent forwards. Such rattling of the bumper cover 10 can be prevented by the tethers 95.

Next, an external airbag system for a vehicle according to various embodiments of the present invention will be described with reference to FIG. 7. The general construction of the airbag system according to various embodiments, besides the installation structure of the inflator, remains the same. Therefore, further explanation of structures or elements that have been mentioned in the description of the above-described embodiment(s) is deemed unnecessary.

Figure 7:
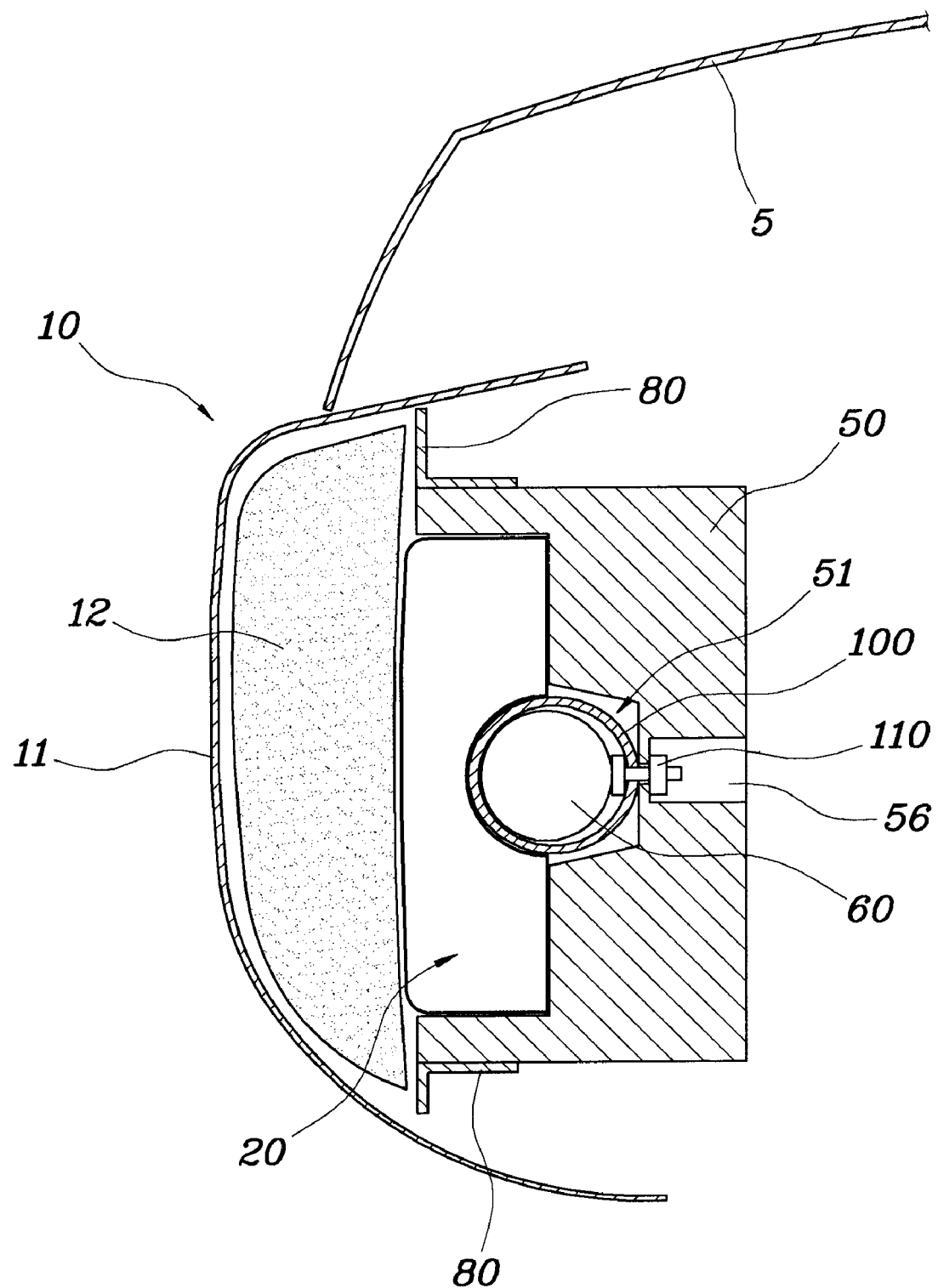
FIG. 7 is a schematic view illustrating an exemplary external airbag system for a vehicle, according to the present invention.

Referring to FIG. 7, an inflator 60 of the airbag system may be installed in a cushion 20. The inflator 60 is fastened to a back beam 50 using a retainer ring 100 which is of a ring shape and surrounds the inflator 60. In detail, the inflator 60, the cushion 20 and the retainer ring 100 are fastened to the back beam 50 by a coupling unit 110 which is fastened to the back beam 50 via the retainer ring 100 and the cushion 20. Reference numeral 56 is an insert hole for a nut positioned in the back beam 50.

In various embodiments of the present invention, the numbers of the cushions may be increased. In this case, the cushions may be disposed symmetrically with respect to a medial portion of the bumper cover with equal numbers.

As described above, in an external airbag system for a vehicle according to the present invention, a cushion does not need to be extracted to outside a bumper cover. Thus, performance of deployment of the cushion can be maintained constant, unlike the conventional art in which the cushion is deployed to outside the bumper cover, with the result that the deployment thereof may be incomplete because of contact with other objects.

In addition, since the cushion supports the bumper skin in the bumper cover, the external force of collision applied to the bumper skin can be effectively distributed along the bumper cover.

Furthermore, in the case where the cushion is deployed to outside the bumper cover, a range within which the cushion can move, particularly in the vertical direction, is increased, so that the cushion is very unstable. However, in the case of the external airbag system of the present invention, the cushion is deployed between the bumper cover and the back beam, so that a range within which the cushion can move is reduced. In addition, when the cushion is completely deployed, the bumper cover can maintain a constant shape. Therefore, the airbag system of the present invention can reliably maintain constant performance.

As well, in the external airbag system of the present invention, the cushion and the inflator are mounted to the back beam, so that the necessity for varying the design of a front structure of the vehicle is reduced.

Moreover, in the external airbag system of the present invention, variation in shape of the bumper cover between before and after the cushion is deployed is relatively small. The cushion is installed in each of the opposite sides of the bumper which are portions at which collisions are most frequent. Therefore, the present invention can be put to practical use. In addition, the present invention can absorb impact induced by a frontal collision of the vehicle and thus can substantially protect passengers in the vehicle.

For convenience in explanation and accurate definition in the appended claims, the terms "inner", "interior", and "rearward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An external airbag system for a vehicle, comprising:
    a bumper cover;
    a plurality of cushions provided behind the bumper cover; and
    an inflator for generating a gas pressure to deploy the cushion, wherein the bumper cover moves in a forward direction by the deploying cushion,
    wherein a portion of the bumper cover is fixed to a back beam, and
    wherein one cushion is provided to one side of the bumper cover and another cushion is provided to the other side of the bumper cover so that each side of the bumper cover is configured to be rotated forwards around the portion that the bumper cover and the back beam are fixed each other by a deployment force of the corresponding cushion.

2. The external airbag system as set forth in claim 1, wherein the back beam is fixed to a medial portion of the bumper cover and the cushions are disposed behind the bumper cover symmetrically with respect to the medial portion thereof with equal numbers.

3. The external airbag system as set forth in claim 1, comprising a plurality of cushions, wherein a degree to which a portion of one cushion adjacent to corresponding distal end of the bumper cover is inflated is larger than a degree to which a portion of another cushion adjacent to the portion that the bumper cover and the back beam are fixed each other is inflated.

4. The external airbag system as set forth in claim 1, further including at least a seam line formed on an inner surface of the bumper cover near the fixed portion of the bumper cover and the back beam.

5. The external airbag system as set forth in claim 1, further including a holding member to limit a movement distance of each side of the bumper cover within a predetermined distance while the cushion is deployed.

6. The external airbag system as set forth in claim 5, wherein the holding member is a tether connected to each side of the bumper cover to the back beam.

7. The external airbag system as set forth in claim 1, wherein the cushion and the inflator are installed in a back beam provided behind the bumper cover and a recess is formed in the back beam to contain the cushion and the inflator therein, wherein a support bracket is provided on at least one of an upper surface and/or a lower surface of the back beam to support, along with the back beam, a rear portion of the cushion that is in a deployed state.

8. The external airbag system as set forth in claim 7, wherein the recess has:
   a first recess for containing the cushion therein; and
   a second recess extending a predetermined depth rearwards from the first recess to contain the inflator therein.

9. The external airbag system as set forth in claim 7, further comprising:
   a retainer provided in the recess between the inflator and the back beam to fasten the inflator to the back beam, wherein the cushion is fastened to the retainer.

10. The external airbag system as set forth in claim 7, further comprising:
    a retainer ring provided between the cushion and the back beam, the retainer ring having the inflator therein and fastened to the back beam.

11. The external airbag system as set forth in claim 1, further comprising:
    a sensing unit for detecting an obstacle in front of the vehicle; and
    a control unit for determining whether the vehicle collides with the obstacle using a signal transmitted from the sensing unit and, when the collision is anticipated, operating the inflator before the vehicle collides with the obstacle.

12. A passenger vehicle comprising the external airbag system of claim 1.

13. An external airbag system for a vehicle, comprising:
    a bumper cover;
    at least a cushion provided behind the bumper cover;
    at least an inflator for generating a gas pressure to deploy the cushion; and
    a back beam provided behind the bumper cover and having therein at least a recess for containing the cushion and the inflator,
    wherein at least one portion of the bumper cover is moved forwards away from an original position thereof by deployment force of the cushion, and
    wherein a support bracket is provided on at least one of an upper surface and/or a lower surface of the back beam to support, along with the back beam, a rear portion of the cushion that is in a deployed state.

14. The external airbag system as set forth in claim 13, wherein a tether is connected between each of opposite sides of the bumper cover and the back beam.

* * * * *